United States Patent [19]
Platte et al.

[11] Patent Number: 4,974,111
[45] Date of Patent: Nov. 27, 1990

[54] METHOD AND APPARATUS FOR ELECTRONICALLY PROCESSING AND RERECORDING RECORDED VIDEO SIGNALS

[75] Inventors: Hans-Joachim Platte, Hemmingen; Robert Einsel, Celle, both of Fed. Rep. of Germany; Werner Adrianus, NL-Geldrop, Netherlands

[73] Assignees: Deutsche Thomson-Brandt GmbH, Villingen-Schwenningen, Fed. Rep. of Germany; U.S. Philips Corporation, New York, N.Y.

[21] Appl. No.: 46,950
[22] PCT Filed: Jul. 1, 1986
[86] PCT No.: PCT/EP86/00385
§ 371 Date: Apr. 8, 1987
§ 102(e) Date: Apr. 8, 1987
[87] PCT Pub. No.: WO87/00381
PCT Pub. Date: Jan. 15, 1987

[30] Foreign Application Priority Data

Jul. 5, 1985 [DE] Fed. Rep. of Germany ....... 3524097
May 30, 1986 [DE] Fed. Rep. of Germany ....... 3618236

[51] Int. Cl.⁵ ........................ H04N 5/782; H04N 5/91; G11B 27/02
[52] U.S. Cl. .................................. 360/14.1; 358/311; 358/335; 358/903; 360/35.1
[58] Field of Search ................. 358/22, 185, 310, 311, 358/320, 323, 330, 335, 337, 903; 360/14.1, 14.2, 33.1, 35.1, 36.1, 15; 369/84–85

[56] References Cited

U.S. PATENT DOCUMENTS

| | | | |
|---|---|---|---|
| 3,975,764 | 8/1976 | Kobayashi et al. | 358/310 X |
| 4,100,607 | 7/1978 | Skinner . | |
| 4,167,759 | 9/1979 | Tachi . | |
| 4,172,264 | 10/1979 | Taylor et al. | 360/14.1 X |
| 4,183,067 | 1/1980 | Kihara et al. . | |
| 4,258,385 | 3/1981 | Greenberg et al. | 358/311 X |
| 4,328,518 | 5/1982 | Kawata et al. . | |
| 4,334,247 | 6/1982 | Lemke . | |
| 4,346,403 | 8/1982 | Tamura | 358/185 X |
| 4,357,624 | 11/1982 | Greenberg | 358/311 X |
| 4,358,786 | 11/1982 | Pfleiderer et al. | 358/335 X |
| 4,364,080 | 12/1982 | Vidovic | 358/185 X |
| 4,602,280 | 7/1986 | Maloomian | 358/903 X |
| 4,668,999 | 5/1987 | De La Cierva, Sr. et al. | 358/22 X |
| 4,706,135 | 11/1987 | Kojima | 360/14.1 |
| 4,710,800 | 12/1987 | Fearing et al. | 358/22 |
| 4,729,028 | 3/1988 | Micic et al. | 358/22 X |

FOREIGN PATENT DOCUMENTS

| | | |
|---|---|---|
| 3509584 | 9/1986 | Fed. Rep. of Germany . |
| 1040521 | 9/1983 | U.S.S.R. . |
| 2018002 | 10/1979 | United Kingdom . |
| 2115595 | 9/1983 | United Kingdom . |

OTHER PUBLICATIONS

Gordon, "An Intelligent Electronic Book System and Publishing Facility", Globecom '82 Conference Record, vol. 3 of 3, Dec., 1982, pp. 1365–1369.

Zahn, "The BCN System for Magnetic Recording of Television Programs", SMPTE Journal, vol. 88, No. 12, Dec., 1979, pp. 823–831.

Hoyer A. and Schlindwein M., "Bildverbesserung durch digitale Nachverarbeitung", Philips Tech. Rdsch. 38, pp. 311–323, 1979.

"High-Speed CMOS Data Book", Integrated Device Technology, Inc., 1985, pp. 2.33–42.

"The T07, A Computer for Everyone", Thomson, Oct., 1982, pp. 1–4.

*Primary Examiner*—Alan Faber
*Assistant Examiner*—W. R. Yung
*Attorney, Agent, or Firm*—Spencer & Frank

[57] ABSTRACT

A method and to an apparatus for electronically processing video signals stored on a record carrier, particularly a magnetic tape or magnetic or optical disk. The video signals are scanned from the record carrier in sections, are written into an intermediate memory, are processed, for example corrected, using a processor and are recorded from the intermediate memory in processed form on a second record carrier or on the same record carrier.

14 Claims, 8 Drawing Sheets

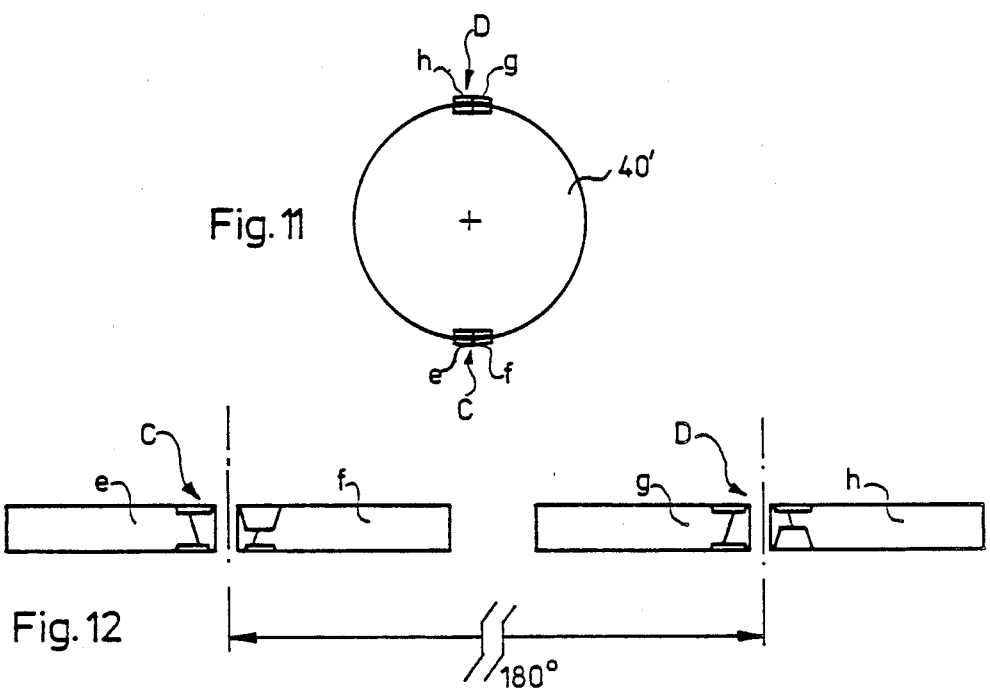
Fig. 11
Fig. 12
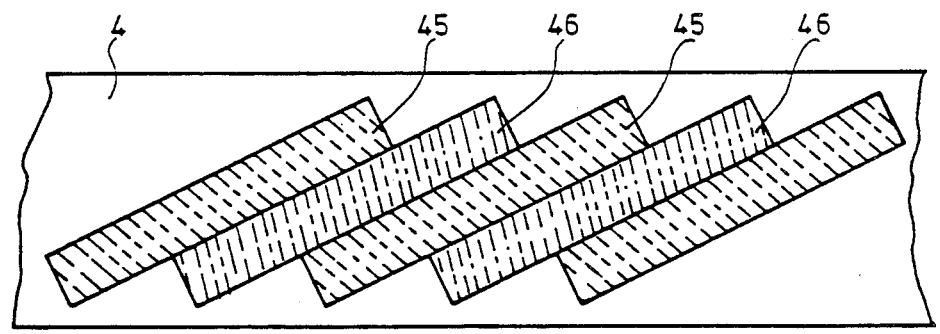
Fig. 13

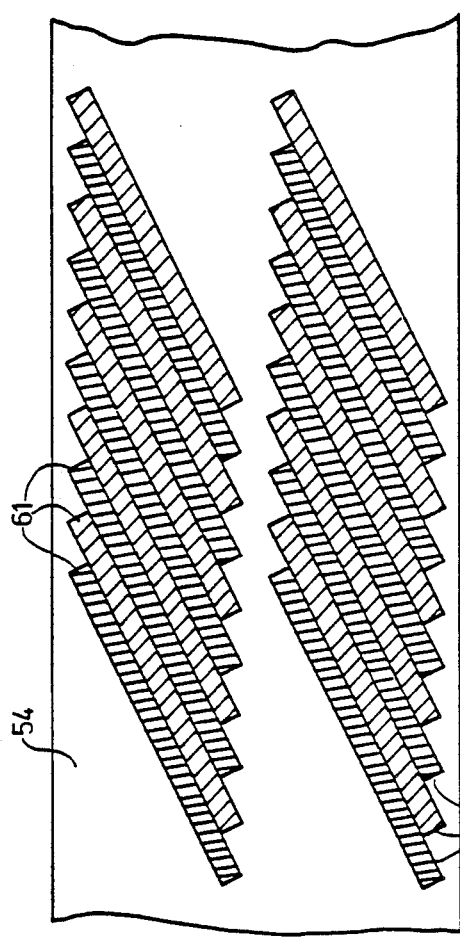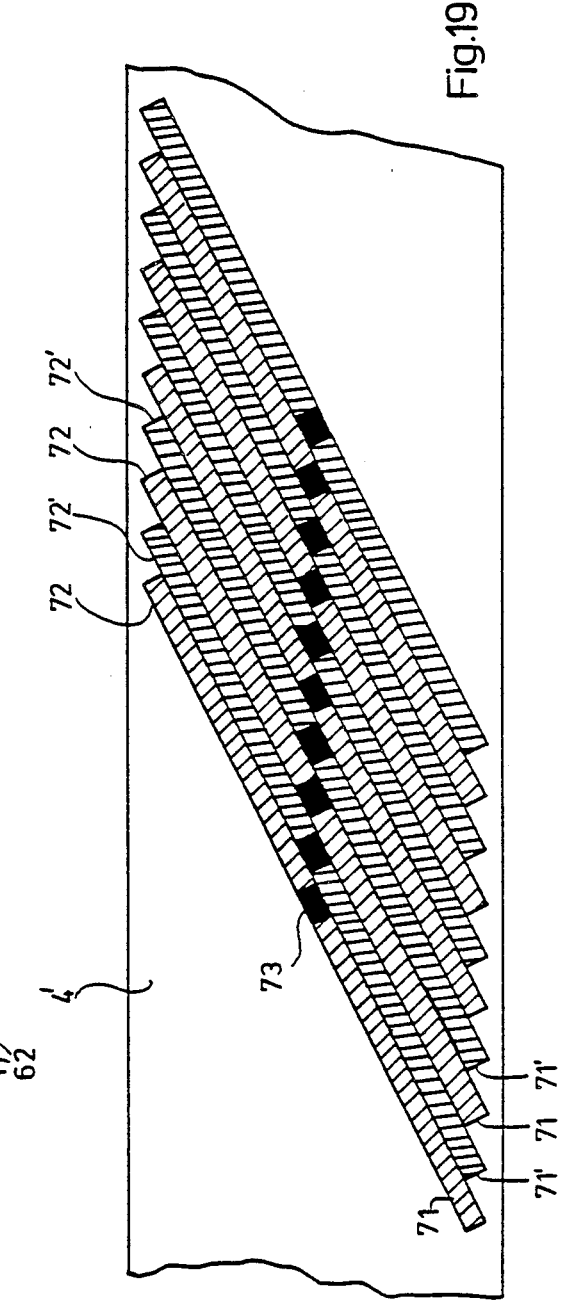

METHOD AND APPARATUS FOR ELECTRONICALLY PROCESSING AND RERECORDING RECORDED VIDEO SIGNALS

BACKGROUND OF THE INVENTION

The invention relates to a method of electronically processing video signals recorded on record medium, particularly magnetic tape or a magnetic or optical disk, and to an apparatus for implementing the method.

It is known in the television studio recording art to process the video signals furnished by a television camera, be it to employ some trick technology or to introduce predistortion to improve the picture in the receiver. All these known measures are rather expensive and hardly usable for home electronic systems.

SUMMARY OF THE INVENTION

It is the object of the invention to provide a method and an apparatus for processing video signals which can also be used in home electronic systems.

The invention is based on the realization that more time is available in a home for processing video signals than in a studio. In principle, the invention utilizes the fact that the video signals to be processed are stored in a primary memory, for example a video recorder, that the stored video signals are written into an intermediate memory for one frame sequence or frame by frame or partial frame by partial frame, are there processed in a predetermined manner by electronic means—in particular corrected, modified and/or retained—and are then written from the intermediate memory back into the same primary memory or into another primary memory.

For the duration of processing, scanning and/or transfer of further video signals from the primary memory is interrupted. During processing of a frame sequence composed of a predetermined number of frames, the primary memory is sampled in steps, for example by operating the video recorder in the start-stop mode. A suitable clock pulse, a gradation influencing device or a programmable computer, for example a home or personal computer, can be utilized for the predetermined processing. Magnetic tapes, and also other recordable carriers, such as video disks, can be employed as the record medium. The video signals may be stored in analog or digital form. The accompanying sound may also be subjected to processing, for example compansion.

BRIEF DESCRIPTION OF THE DRAWINGS

Further advantages and features of the invention will be described below with reference to preferred embodiments that are illustrated in the drawings The individual drawing figures depict the following, sometimes not to scale with respect to some of the other figures:

FIG. 11, a plan view of a head wheel provided in a third embodiment employing the slant track method;

FIG. 12, a partially developed view of the cylinder jacket of the head wheel of FIG. 11 in the region of the heads;

FIG. 13, a track pattern recorded by means of two heads of the head wheel of FIG. 11;

FIG. 18, a track pattern recorded by means of the heads of the head drum according to FIG. 16; and FIG. 19, a track pattern recorded by means of a slant track method according to a fifth embodiment.

DESCRIPTION OF THE PREFERRED EMBODIMENTS

Figure 1:
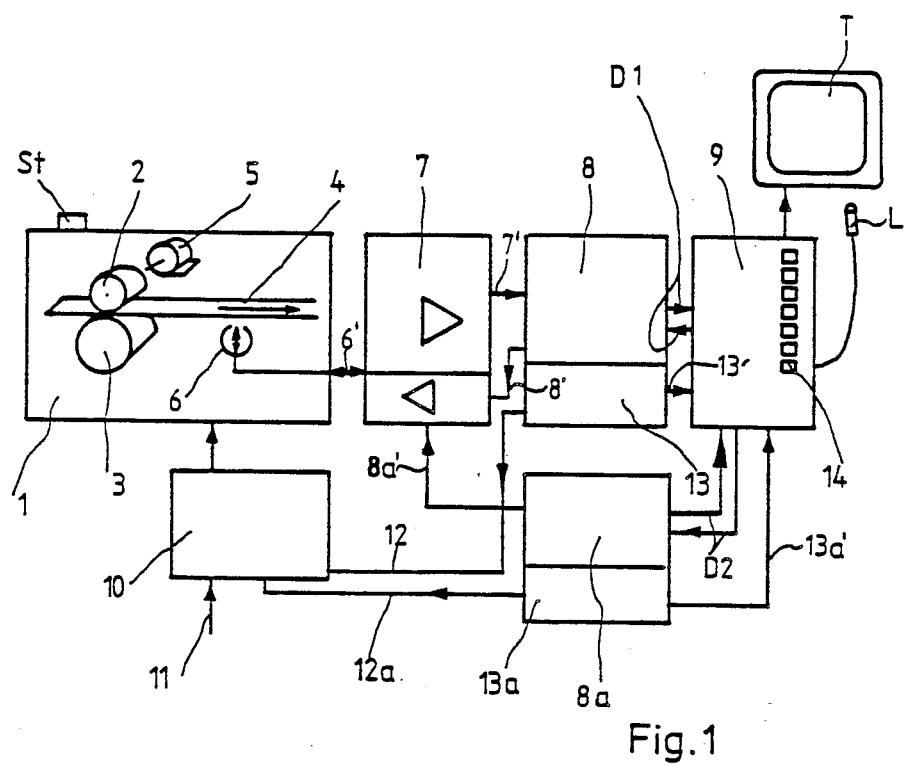
FIG. 1, the block circuit diagram of an apparatus for implementing the method.

FIG. 1 shows symbolically a video recorder 1 including record medium in the form of a magnetic tape 4 which is moved by means of a drive roller 2 (capstan) and a rubber pressure roller 3. Drive roller 2 is driven by a motor 5. A symbolically shown head 6 is provided to record video signals corresponding, for example, to a frame sequence, and to play back these recorded signals.

The recording and playback system may be a conventional video recorder operating according to the VHS, Beta, Video-2000 or 8-mm system. In a preferred embodiment, as it will be described below with reference to FIGS. 2 to 4, a video recorder is employed as it is disclosed in German Patent Application No. P 35 09 584.9. In this case, the video signals are recorded in longitudinal tracks of limited length which are arranged parallel to one another and these longitudinal tracks follow one another in blocks. FIGS. 5 to 19 show further preferred embodiments in which video recorders are employed which operate according to the slant track method. It is understood that the invention can also be employed with video recorders in which the video signals are recorded on tracks extending essentially transversely to the direction of movement of the record carrier.

The signals scanned from tape 4 by head 6 are fed via a line 6' to a head amplifier 7 and from there via a line 7' to a memory 8 which may be part of video recorder 1. Memory 8 has such dimensions that it is able to store the video signals corresponding to a frame or a partial frame. A memory of type IDT 7201 or IDT 7202, sold by Integrated Device Technology, Inc., for example, can be used as the memory.

Memory 8 is connected with the input of a processor 9, e.g., a microprocessor or a separately available home or personal computer in such a manner that processor 9 is able to process the stored video signals in a predetermined manner—e.g. change some of them and leave some of them—and the processed version is stored in the same memory 8 (e.g. at the same location, i.e. "in place") or in another memory 8a. Processor 9 may be a computer or microprocessor circuit, preferably includes means for accommodating prepared correction and/or modification programs and is generally programmable by way of a keyboard.

The connection between memory 8 and processor 9 is made via a DMA (direct memory access) interface D1; memory 8a and processor 9 may be connected in a corresponding manner via a DMA interface D2.

If a recording is to be processed, the user can position tape 4 in the video recorder by means of conventional operating keys to the location at which processing of the recorded video signals is to begin. It may be provided that after completion of the positioning step, a frame number possibly also stored on tape 4 is determined and transferred to processor 9. It is understood that this frame number may also be fed to processor 9 by way of a keyboard. The duration of the scene to be processed or the number of frames involved can also be fed to processor 9 by way of a keyboard. However, as an alternative, the frame number of the last frame may be fed in in the same manner as the frame number of the first frame of the scene to be processed and this number is then forwarded from the video recorder to the processor.

Following, for example, a manually or automatically put in start instruction to processor 9, the latter monitors the entire processing sequence, i.e. in addition to the predetermined electronic processing of the video signals possibly also the periodically repeated start/stop mode of the video recorder. The number of start/stop cycles is calculated as the quotient of the number of frames to be processed and the number of fractions of a frame (or the number of frames) which memory 8, 8a is able to accommodate in the course of one cycle.

For video signal processing, the still picture mode provided in the video recorder is switched on by way of a switch St. A start-stop device 10 is provided for the recorder and simultaneously starts the relative drive between tape 4 and head 6 as well as the signal transmission from head 6 to memory 8. Device 10 is switched on or off by means of an externally accessible actuating member 11 and is thus enabled to transmit instructions. Device 10 receives its start and stop instructions via a control line 12. Memory 8 has an associated detector 13 which, after storage of the video signal corresponding to the respectively last pixel from tape 4 puts out a signal via control line 12 to device 10 to stop the relative drive between tape 4 and head 6 and/or the signal transmission. At the same time, processor 9 receives an instruction from detector 13 via a control line 13' to start video signal processing. For reasons to be described below, memory 8a similarly has an associated detector 13a which is connected with device 10 and with processor 9 via control lines 12a and 13a', respectively.

Video signal processing may involve a measure to improve the picture, i.e. performing a gradation, sharpening the contours ("crispening") or the like. However, it is also possible to arbitrarily modify the picture, for example to perform a trick effect. This may involve coloring, for example, the display of wrong colors or the incorporation of graphics in pictures - for example, legends or moving symbols in video games. The selection of the processing scheme may be made, for example, by means of a push button arrangement 14. Or the processor may be a home computer having an input device for prepared program modules, program cassettes or program disks.

In the illustrated embodiment, a further input device connected to processor 9 is a photosensitive detector in the form of a so-called light pen L, as known, for example, from the home computer of type "TO 7 (Ref. UC 90.001)" made by Thomson (France). By placing the photosensitive tip of light pen L at certain locations on a screen T, the coordinates of these locations can be put into processor 9 without it being necessary to enter the numerical values of the coordinates by means of numerical keys or the user even knowing them. Parts of the picture to be processed may easily be put into processor 9, for example by "picking up" their respective starting and ending points shown on screen T by means of light pen L. It is understood that the so-called "mouse" known from office and home computers in conjunction with a cursor controlled thereby and displayed on screen T can likewise be used.

The video signals are processed in succession, frame by frame or partial frame by partial frame, with much time being available for each frame or partial frame compared to processing times in television studios. Each video signal corresponding to a partial frame is transferred to memory 8 in the still picture mode and is then processed, with the relative drive between tape and head being stopped and almost any desired length of time being available for processing of each memory content with the aid of the processor, e.g. a home computer.

As soon as processing is completed and the processed signals are stored again—for the in-place mode in the same memory 8, otherwise in memory 8a—device 10 receives the instruction to switch on the relative drive between tape and head—via control line 12 from detector 13 or via control line 12a from detector 13a—and the memory contents are stored on a record medium, either on the same tape 4 or on another record carrier. It may also be provided that device 10, in a manner not shown in detail here, receives its control instructions from processor 9. The information regarding the "fill level" of memories 8, 8a possibly required in this case may be reported to processor 9, for example, via DMA interfaces D1, D2 or by detectors 13, 13a via control lines 13', 13a'.

The processed video signals stored in memory 8 or 8a travel from there via a line 8' or 8a', respectively, into a return channel of amplifier 7 from where they are fed to head 6 via line 6' and, in the present embodiment, are recorded in a correlated region on the same tape 4. In this case, for example, the one side or half of tape 4 is intended for the video signals to be processed and the other side or half is intended for the processed video signals. In this way, the processed signal can be constantly compared with the original signal. For this purpose, the original signal and the processed signal are recorded on the tape alongside one another in the direction of the track and the heads are positioned accordingly. For this purpose, recording methods as shown in FIGS. 2 to 4 and 5 to 19 are of advantage.

Figure 2:
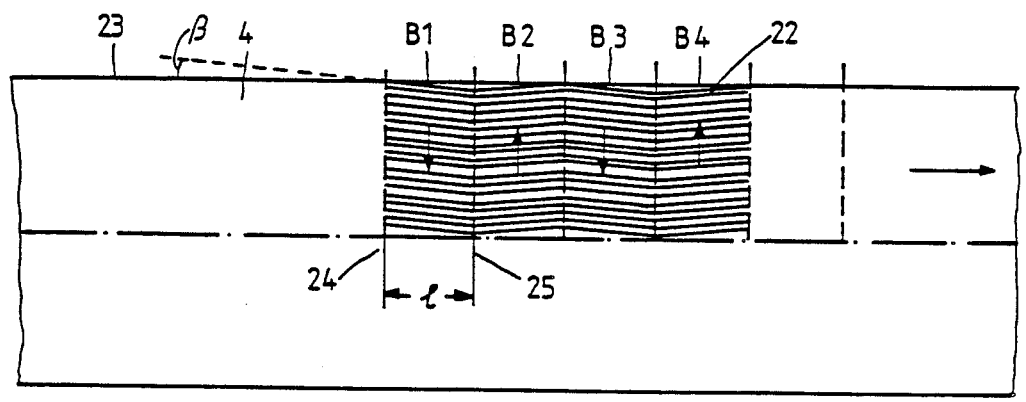
FIG. 2, a recording scheme for a magnetic tape in a first embodiment.

FIG. 2 is an illustration, not to scale, of a magnetic tape 4 and a recording scheme suitable for recording digital video signals. The video signals are recorded in tracks 22 which are arranged approximately parallel to tape edges 23 and have a limited length. In practical tests, an embodiment having an angle of inclination $\beta = \arctan b/l$ has been found satisfactory, where b is the width (10 μm) and l the length (15 mm) of tracks 22. Thus, tracks 22 here extend at an angle of inclination $\beta$ of approximately 0.04° and are thus approximately parallel to tape edges 23. In FIG. 2, tracks 22 lie next to one another in blocks and the connecting delimitation lines 24, 25 of all track beginnings and track ends of a block Bn (n=1, 2, 3, ...) are arranged essentially perpendicular to tape edges 23.

Figure 3:
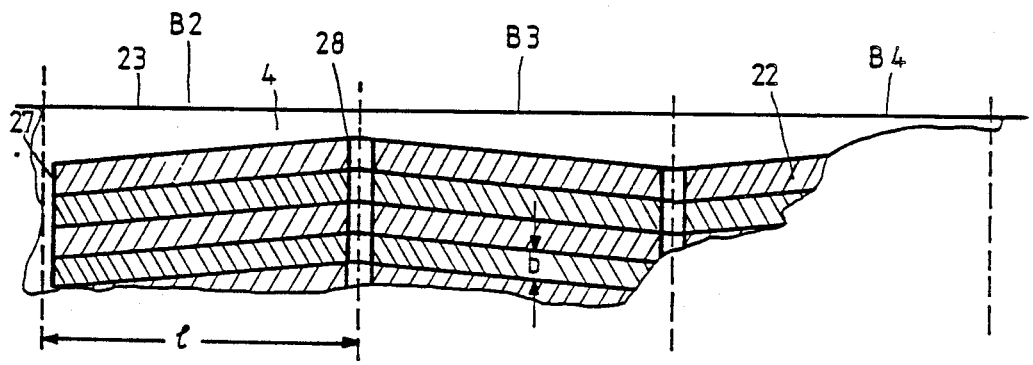
FIG. 3, an enlarged sectional view of FIG. 2.

FIG. 3 is an enlargement of the scheme. Tracks 22 are each identified by a starting pulse 27 and an ending pulse 28, so that tracks 22 can be recognized again during scanning. Blocks Bn lie next to one another practically end to end.

Figure 4:
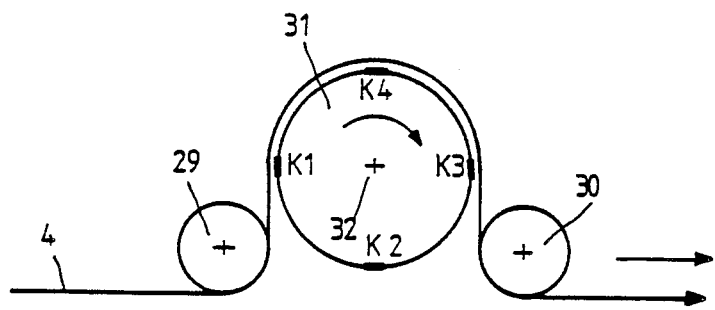
FIG. 4, a plan view of a head wheel arrangement provided in the first embodiment.

FIG. 4 is a basic illustration of a head wheel 31 having four heads K1, K2, K3, K4 and of tape 4 which is guided by guide rollers 29, 30 around head wheel 31 and loops around this wheel 31 by about 180°. Head wheel 31 may be part of a drum. Axis 32 of head wheel 31 is disposed perpendicular to the direction of tape movement and parallel to the tape surface. Head wheel 31 is moved up and down in the direction of its axis 32. Each head K1 to K4 writes a track 22. Due to the movement of the tape and with continuous movement of head wheel 31 and tape 4, this track extends slightly at an angle, as has already been described in detail above in connection with FIG. 2.

The recording scheme described so far with reference to FIGS. 2 to 4 not only permits rapid location of recorded tracks 22, by actuating heads K1 to K4 it is also possible to write the corrected video signals directly next to the original video signals without movement of the tape and to continue moving the tape, for example, by one track length l only after one sequence of scanning—storing—correcting—storing—recording.

With reference to FIG. 5 to 19, further preferred embodiments will be described below in which a video recorder operating according to the slant track method is used to record and play back picture information processed according to the invention.

Figure 5:
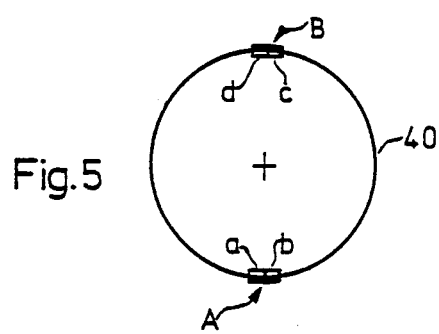
FIG. 5, a plan view of a head wheel provided for a second embodiment employing the slant track method.
Figure 6:
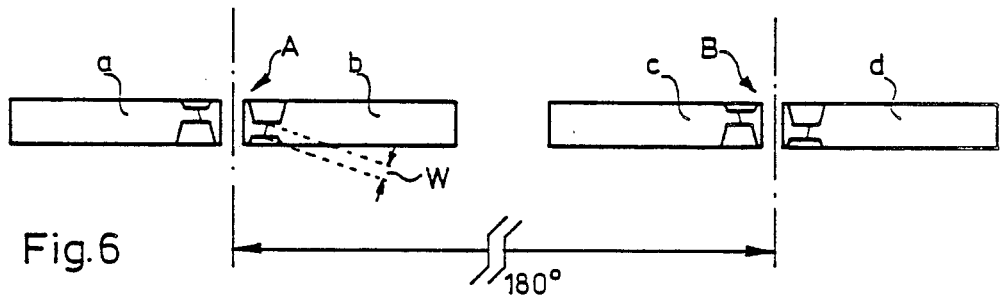
FIG. 6, a partially developed view of the cylindrical jacket of the head wheel of FIG. 5 in the region of the heads.

In FIGS. 5 and 6, a head wheel 40 for a known slant track method is indicated in a second embodiment. This head wheel may be, for example, a head wheel for a VHS, Beta, Video-2000 or 8-mm system. Head wheel 40 has two mutually diametrally opposed twin heads A and B, of which each has two individual heads a, b and c, d, respectively. The axial position of these heads is adjusted in such a manner that the gaps of heads a and c have the same axial position ("height"). The same applies for heads b and d, with the differences in height between the gaps of heads a and b and heads c and d correspondingly to approximately one-half the track spacing on a magnetic type 4' suitable for the system in question, see FIG. 9.

Figure 7:
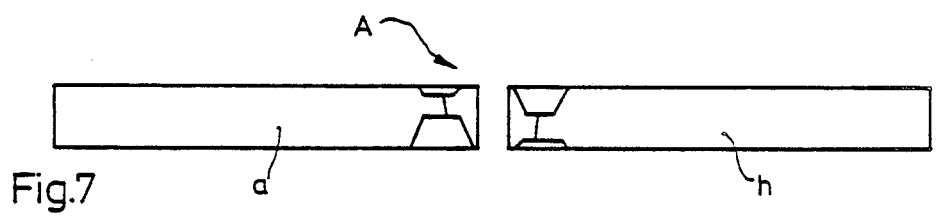
FIG. 7, a plan view of a twin head of the head wheel of FIG. 5.
Figure 8:
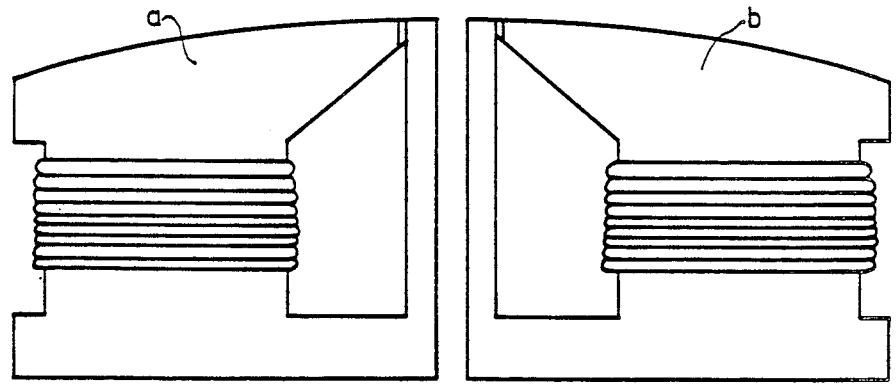
FIG. 8, a side view of the twin head of FIG. 7.

FIGS. 7 and 8 show a preferred embodiment of a twin head A, as it corresponds to the prior art for analog video recordings on magnetic tape. Similarly configured heads are used, for example, to realize more difficult trick modes, such as, for example, a still picture in VHS recorders.

Figure 9:
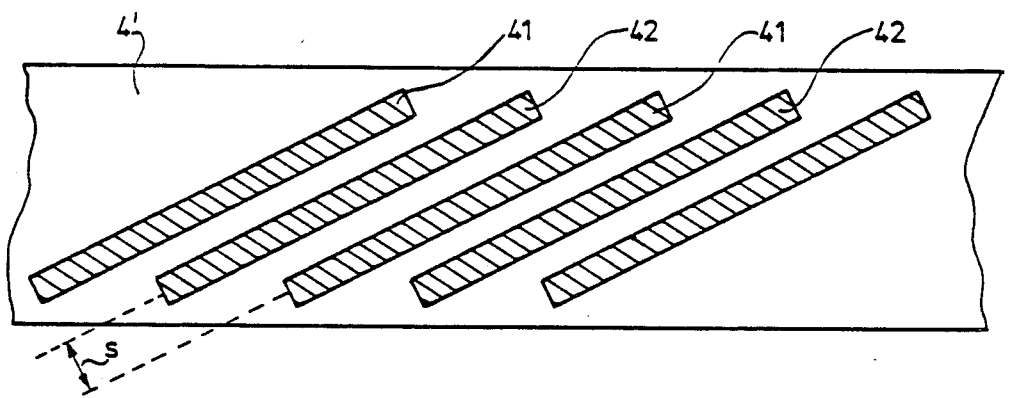
FIG. 9, a track pattern recorded by means of two heads of the head wheel of FIG. 5 for the original picture information.

The "track pattern" of the recorded, not yet processed, i.e. original, picture information is shown in FIG. 9. This pattern is recorded and played back by heads a and c as shown in FIG. 6. The gap width w of heads a to d, the rotational velocity of head wheel 40 and the velocity of the tape advance are matched to one another in such a manner that—as shown in FIG. 9—the distance s between tracks 41 and 42 to be recorded or played back in this manner, i.e. the distance between corresponding points in two adjacent tracks, for example the distance between the longitudinal center lines of these tracks, corresponds to twice the track width.

Figure 10:
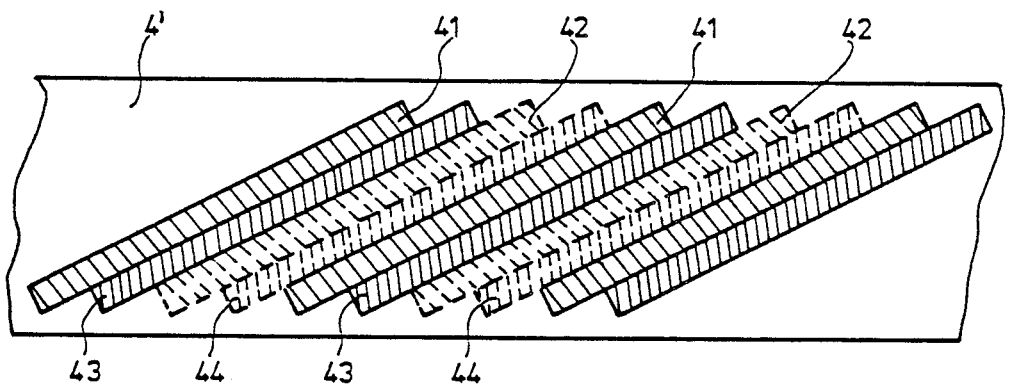
FIG. 10, the track pattern of FIG. 9 showing additionally recorded processed picture information.

FIG. 10 shows the trace pattern of the original picture information and of the processed picture information. Tracks 41 and 42 were again recorded by heads a and c and contain the original information. The tracks marked 43 and 44 are recorded by heads b and d shown in FIG. 6 and contain the processed information. To substantially prevent overwriting of tracks 41 and 42 during recording of tracks 43 and 44 it is important, on the one hand, that heads a to d are adjusted exactly to the above-described respective axial height and, on the other hand, not only the distance between tracks 41 and 42, but also the distance between tracks 43 and 44 corresponds to twice the track width. If, in order to reduce crosstalk between adjacent channels, the azimuth recording method is employed, care must be taken that the gaps of heads a and c both have the same azimuth angle and an azimuth angle not identical therewith is provided for the gaps of heads b and d.

A significant advantage of the above-described embodiment of the invention in a slant track system is that it can be used to record and play back signals recorded according to a conventional video recording standard, for example a VHS, Beta, Video-2000 or 8-mm system, so that complete compatibility is realized. This is accomplished by the measures to be described below.

With reference to FIG. 6, it is assumed that for all heads a to d the gap width corresponds to the track width of one of the conventional video recording standards. This would only require two heads, for example heads a and either c or d. However, head c has the "wrong" azimuth for this purpose, head d has the wrong position (axial height).

One possible solution is to fasten twin heads a/b and/or c/d or one or a plurality of heads a to d to one or a plurality of actuators to thus permit accurate control of the axial height. Piezoceramic actuators as they are used in the Video 2000 system are highly suitable for this purpose.

Another possibility is the use of an additional, fifth, head having the suitable azimuth. Because this fifth head cannot be arranged at the head wheel to be offset by precisely 180° with respect to head a, since heads c and d are disposed there, the axial height of this fifth head must differ slightly from the axial height of head a. In this way, optimum tracking can always be realized. The time delay of the signals from the fifth head caused by the angular position deviating from 180° can be easily corrected by electronic means.

Other solutions are also possible to realize compatibility with already existing standards. They are based on the known fact that improved quality of recording heads and tapes which would result in improved signal to noise ratios instead also permit recording and playback of narrower tracks with approximately the original quality. A third embodiment in which again a video recorder operating according to the slant track method is employed and which utilizes the above mentioned knowledge will now be described with reference to FIGS. 11 to 15.

Heads e and g shown in FIGS. 11 and 12 and arranged at a head wheel 40' offset with respect to one another by 180° have the same track width and their head gaps have mutually opposite azimuth angles, with this all corresponding to one of the conventional video recording standards so that here again complete compatibility is assured with the respective video recording standard.

Figure 14:
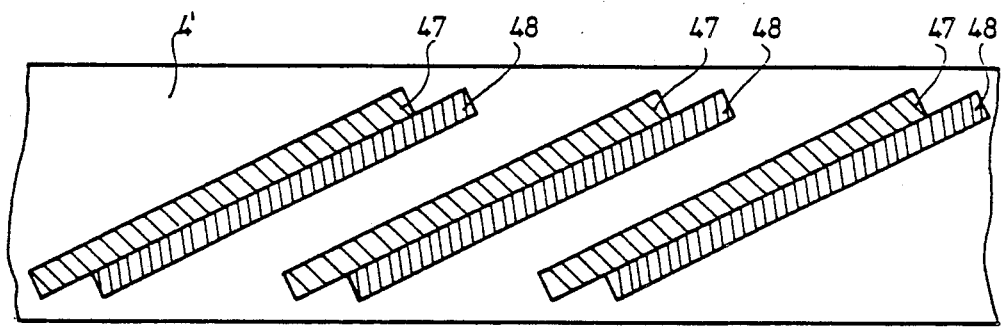
FIG. 14, a track pattern recorded by means of two further heads of the head wheel of FIG. 11.

FIG. 13 shows tracks 45 and 46 which are recorded with the aid of heads e and g, respectively. The gap widths of heads f and h in FIG. 12, which are again arranged at head wheel 40' offset with respect to one another by 180° correspond to one-half the gap widths of heads e and g. The differences in axial height between the gaps of heads f and h correspond approximately to the distance between tracks 47 and 48 to be recorded and played back by them and as shown in FIG. 14. Heads e and f as well as heads g and h are configured as twin heads C and D, respectively, similarly to twin head A in FIGS. 5 to 8. Heads e and g serve to record and play back the original picture information and heads f and h serve correspondingly for the picture information processed according to the invention.

Figure 15:
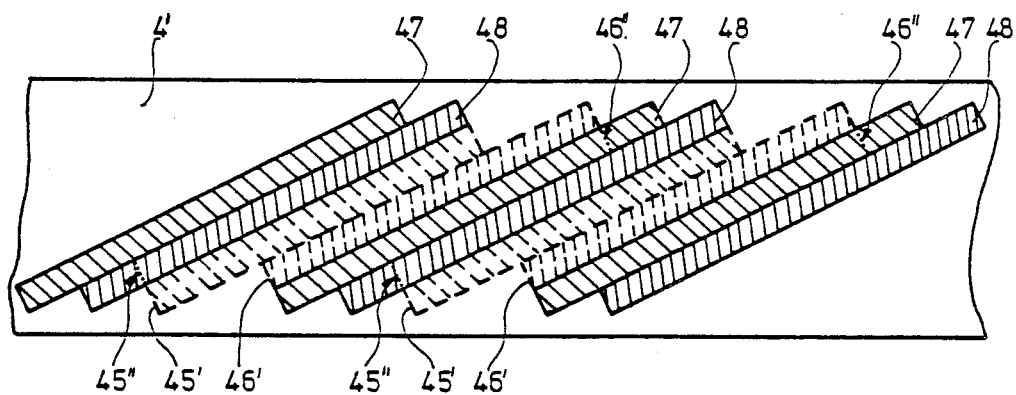
FIG. 15, a track pattern of a recording made initially according to FIG. 13 and thereafter according to FIG. 14.

If a tape 4' on which information has been recorded with the aid of heads e and g (FIG. 13) is now written on by means of heads f and h (see FIG. 14), this results in a track pattern—similarly to tracks 41 to 44 of FIG. 10—as it is shown in FIG. 15. However, here tracks 47 (FIG. 14) are written over most of tracks 45 (FIG. 13), with tracks 45' which are reduced to approximately half the track width remaining of original tracks 45. In a corresponding manner, tracks 48 are written over tracks 46, with tracks 46' which are reduced to approximately half the track width remaining of original tracks 46. For the purpose of clarification, FIG. 15 shows dotted lines 45'', 46'' representing the beginning or the end of the now over-written region of tracks 45, 46— where this does not coincide approximately with the beginning or end of tracks 48, 47. In the present embodiment, the position of heads e to h with respect to their axial height angular position at head wheel 40' and azimuth angle has been selected—under consideration of the respective recording standard—so that two newly recorded tracks 47, 48 are followed by the "remainders" 45', 46' of two originally recorded tracks 45, 46 which are then again followed by two newly recorded tracks 47, 48, etc.

For playback, heads e and g, whose gap width corresponds approximately to twice the track width of tracks 45', 46', 47', 48', read the signals from tracks 45' and 46', respectively. Crosstalk from adjacent tracks 48 and 47, respectively, can be minimized by optimizing the azimuth angles of heads f and h and/or by means of a modulation system for recording of the processed picture information.

Figure 16:
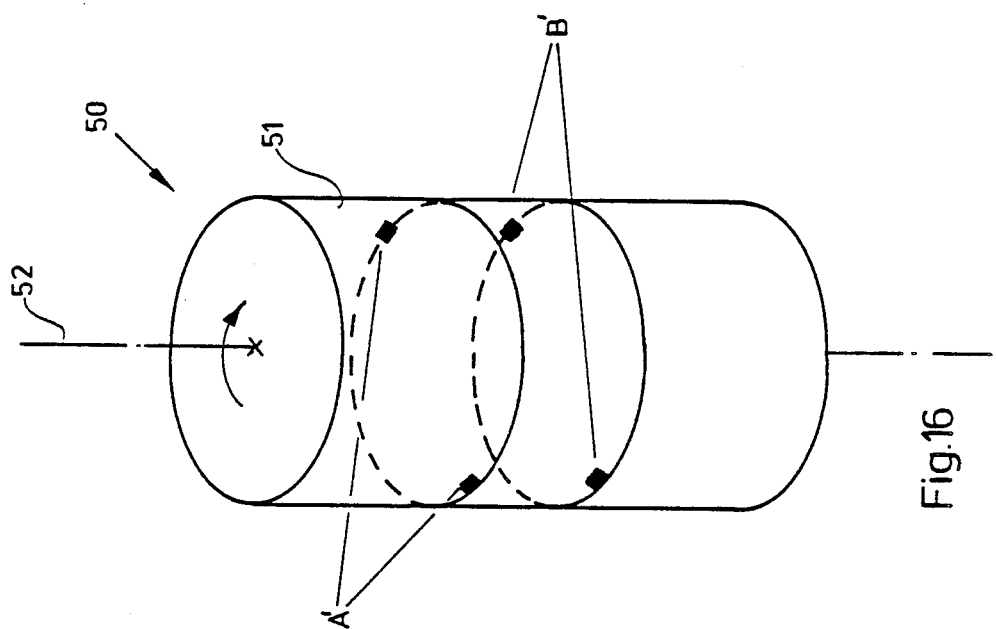
FIG. 16, a perspective view of a head drum provided in a fourth embodiment employing the slant track method.

A fourth embodiment will be described below with reference to FIGS. 16 to 18. Here again, a recording and playback system operating according to the slant track method is employed. As shown in FIG. 16, the recording and playback device of this embodiment includes two superposed slant track head systems A' and B' arranged on the cylinder jacket 51 of a drum 50. Drum 50 is mounted so as to rotate about an axis 52 in a manner not shown in detail. The remaining configuration of drum 50 and head systems A', B' may correspond to the state of the art of conventional slant track recording systems in which the head systems are arranged in a plane at a head wheel or the like.

Figure 17:
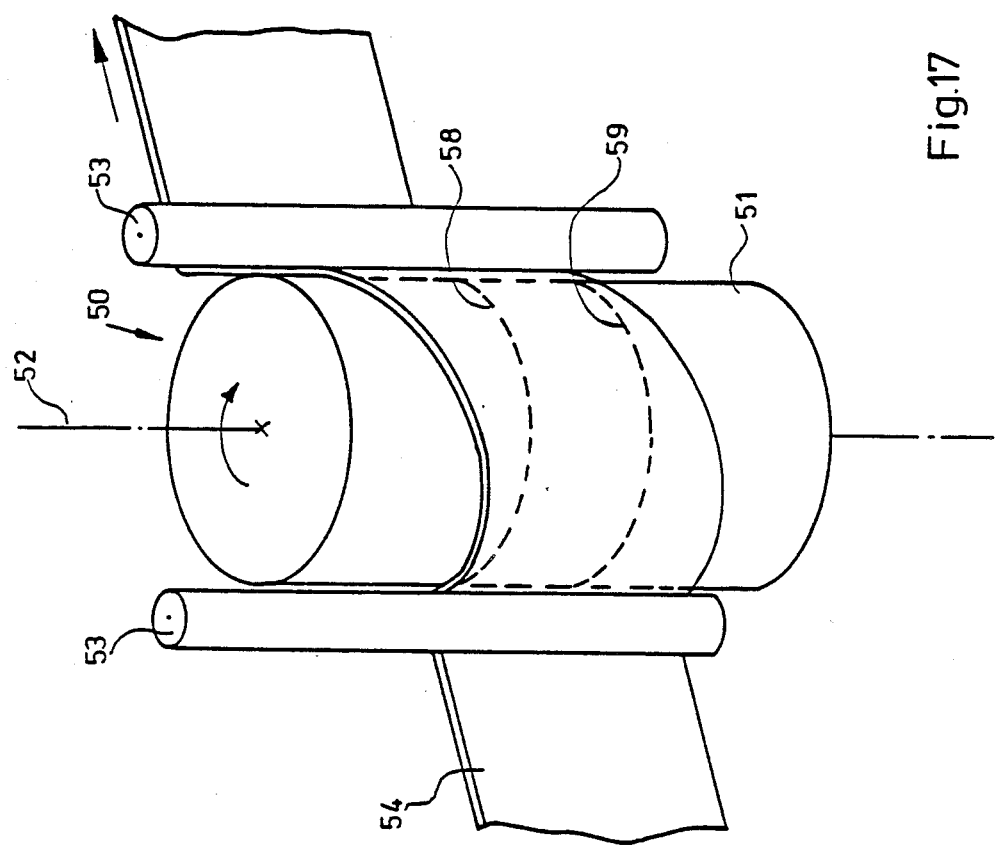
FIG. 17, a perspective view of the interaction between the head drum of FIG. 16 and a magnetic tape looped partially around it.

FIG. 17 shows a magnetic tape 54 looped around a drum 50 and guided by two rollers 53, with the tape edges extending obliquely at an angle other than 90° with respect to axis 52. Broken curves 58 and 59 indicate the paths of head systems A' and B'. The associated track patterns are shown in FIG. 18, with tracks 61 being associated with head system A' and tracks 62 being associated with head system B'.

It is understood that one of head systems A' or B' and its associated track pattern an be employed to record and play back the original picture information and the other head system can be used for the processed information.

A fifth embodiment which likewise employs a slant track system will be described with reference to FIG. 19. Here, a track pattern is shown is recorded according to a slant track method, for ex according to the VHS, Beta, Video-2000 or 8-mm standard. The individual tracks are each divided into a first part formed of parallel tracks 71, 71' on the one half of magnetic tape 4' for the unprocessed information and a second part formed of two parallel tracks 72, 72' on the other half of the tape for the processed information. Tracks 71, 72 are here recorded under a different azimuth than tracks 71', 72' immediately adjacent thereto. Moreover, tracks 71, 72 which are aligned with one another—as are tracks 71', 72'—are separated from one another in a region 73 lying approximately in the center of the width of the tape. This region 73 may be marked magnetically on tape 4', for example, by a predetermined HF identification signal which is transmitted with the aid of the heads provided for recording and playback of tracks 71, 72, 71', 72'.

In all stated embodiments it is possible to read, correct and re-record track by track. However, it is also possible to adapt the duration of reading to the respective capacity of memory 8, 8a and thus, possibly write all tracks belonging to one full frame into a full frame memory.

What is claimed is:

1. A method of electronically processing video signals recorded on a first record carrier, comprising the steps of:
   (a) reading original video signals which are previously recorded on the first record carrier and represent a predetermined number of frame sequences, frames or partial frames and writing the original video signals into an intermediate memory;
   (b) then interrupting the reading of further original video signals from the first record carrier and/or their transfer into the intermediate memory;
   (c) processing with a processor the video signals written into the intermediate memory so as to be corrected, modified and/or retained in a predetermined manner;
   (d) writing the processed video signals into one of the intermediate memory and another memory;
   (e) recording the written processed video signals from the one of the intermediate memory and another memory on the first record carrier such that the frame sequences, frames or partial frames produced therefrom during playback take on a predetermined local and time position, and each processed video signal is recorded on such a surface or such surface sections of the first record carrier which are not occupied by the original video signal to be processed;

(f) thereafter, interrupting the recording on the first record carrier; and (g) repeating steps (b) to (f) a predetermined number of times for further original video signals to be processed.

2. A method according to claim 1, wherein the original video signals previously recorded on the first record carrier represent a frame sequence and the spatial and time positions of each frame or partial frame within a frame sequence are clearly defined for the original video signals representing a frame or a partial frame of the frame sequence; said step of recording including the step of recording the processed video signals at a predetermined position within the then completely processed frame sequence.

3. A method according to claim 1, wherein said step of recording the processed video signal includes the step of recording the processed video signals in sections with a same recording device which accomplishes reading of the original video signals in sections.

4. A method according to claim 3, wherein said step of recording the processed video signals in sections includes the step of recording each processed video signal in a defined spatial association with the video signal sections to be processed.

5. A method according to claim 1, wherein said step of recording on the first record carrier comprises the step of recording the processed video signals on the first record carrier so that surfaces or surface sections containing video signals to be processed essentially alternate with surfaces or surface sections containing video signals that are already processed.

6. A method according of claim 1, wherein the surfaces or surface sections of the first record carrier which are not occupied by the original video signal to be processed include respective spaces between the tracks corresponding to the original video signals to be processed, and said step of recording on the first record carrier comprises the step of recording the processed video signals on the first record carrier so that the tracks corresponding to the processed video signals are recorded essentially in the spaces.

7. A method according to claim 1, wherein each track has an associated address or is provided with an address.

8. A method according to claim 1, wherein the intermediate memory is part of a home video recorder.

9. A method according to claim 1, wherein means are provided for selecting any location on the first record carrier for scanning an original video signal to be processed.

10. A method according to claim 1, wherein said step of recording on the first record carrier includes the step of recording each processed video signal in a defined spatial association with the video signal sections to be processed.

11. An apparatus for electronically processing video signals recorded on a record carrier, comprising:

a video recorder having means for still picture playback, a head arrangement for transmitting video signals to and from the record carrier and that can be switched between recording and playback and a controllable start-stop device for starting and stopping the transmission of video signals to and from the record carrier;

a memory connectable to said head arrangement to be fed thereby with video signals corresponding to a frame sequence, a frame or a partial frame during the transmission of video signals from the record carrier;

a processor for processing the video signals transmitted to said memory while transmission of video signals to and from the record carrier is interrupted, and storing the processed video signals in said memory;

means for transmitting the processed video signals from said memory to said head arrangement to be recorded thereby on the record carrier;

means for driving said head arrangement and the record carrier relative to each other; and means for interrupting the relative drive for the duration of video signal processing, said interrupting means being responsive to reaching a predetermined fill level in said memory for providing a control signal to said start-stop device so as to stop said drive means for storage of video signals coming from said head arrangement, and to start for storage of processed signals.

12. An apparatus according to claim 11, further comprising means for switching said video recorder from recording to scanning, after recording of all of the processed signals contained in the memory and for positioning said head arrangement to a predetermined beginning of the next video signals still to be processed.

13. An apparatus according to claim 11, wherein the record carrier is a magnetic tape and said head arrangement includes a head wheel or head drum, first heads on said head wheel or head drum corresponding to those of a video recording standard and second heads on said head wheel or head drum also corresponding to the video recording standard, the gap width of said second heads approximately corresponding to one-half the gap width of said first heads, said second heads with respect to their axial height, being disposed on said head wheel or head drum such that their gaps sweep one half or the other half of tracks to be recorded on the magnetic tape by the first heads.

14. An apparatus according to claim 11, wherein the record carrier is magnetic tape and said recorder includes a head drum having a cylindrical jacket provided with two axially superposed head systems of which one or both correspond to a video recording standard and which are arranged in such a manner, with respect to their axial height, that the first head system sweeps one half of the magnetic tape and the second head system sweeps the other half of the magnetic tape.

* * * * *